Patented Dec. 18, 1923.

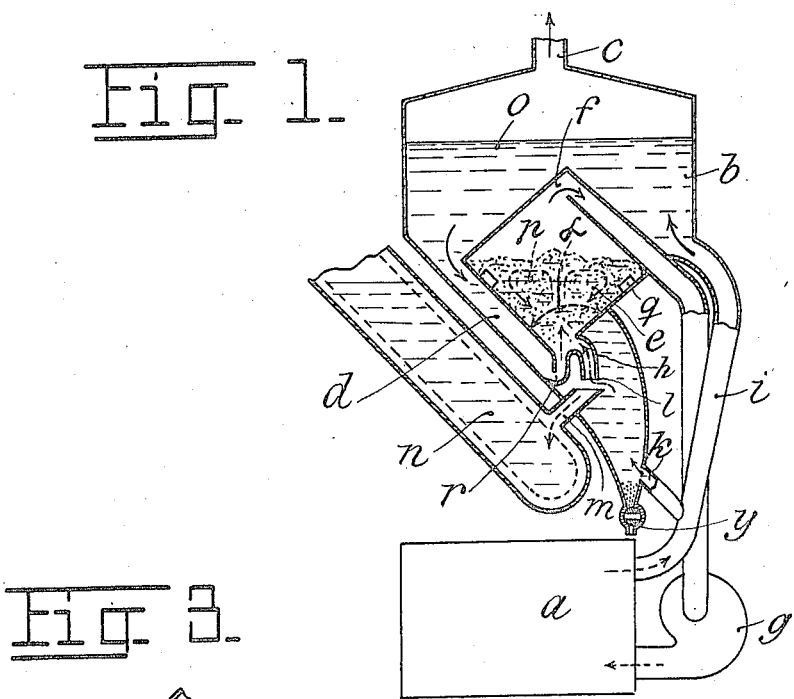
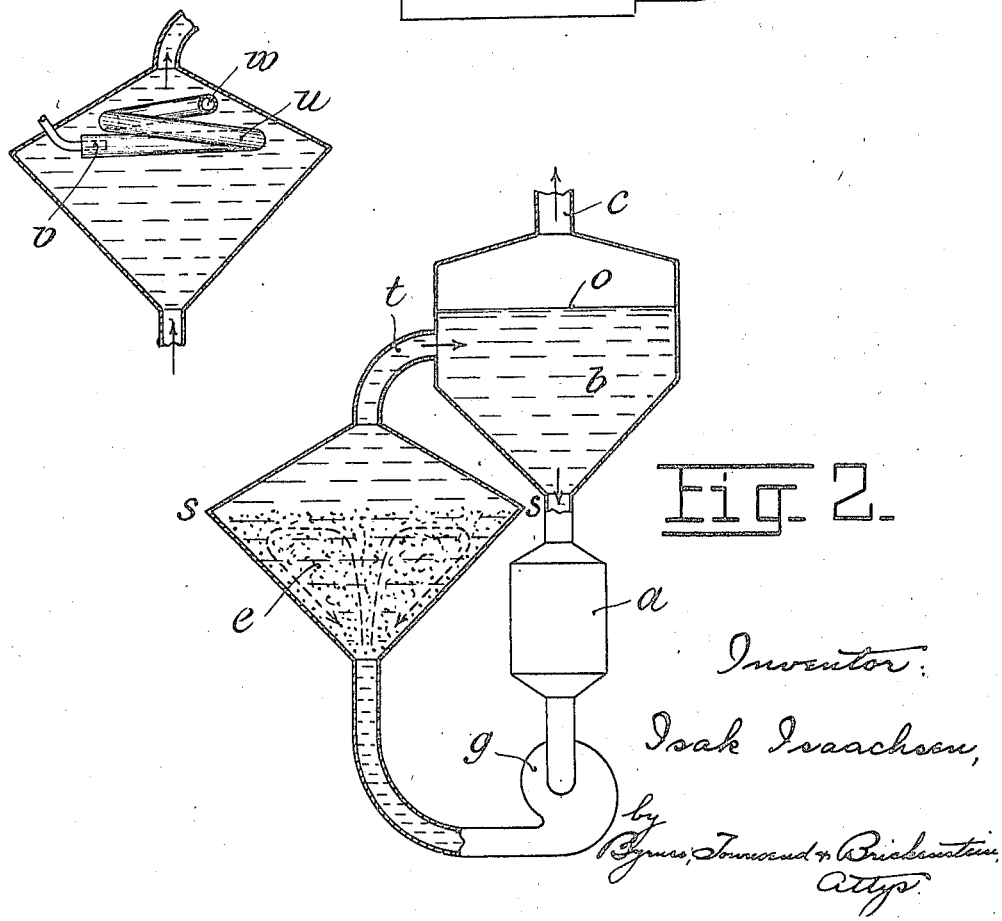

1,478,337

UNITED STATES PATENT OFFICE.

ISAK ISAACHSEN, OF CHRISTIANIA, NORWAY, ASSIGNOR TO A/S DE NORSKE SALT-VERKER, OF BERGEN, NORWAY.

METHOD OF TREATING SOLUTIONS TO OBTAIN SOLID CONSTITUENTS THEREOF SEPARATED IN A COARSE CONDITION.

Application filed October 12, 1921. Serial No. 507,231.

*To all whom it may concern:*

Be it known that I, ISAK ISAACHSEN, a subject of the King of Norway, residing at Christiania, Norway, have invented certain new and useful Improvements in Methods of Treating Solutions to Obtain Solid Constitutents Thereof Separated in a Coarse Condition; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to processes of treating solutions to separate solid constituents therefrom and has for its object a method by which the separated solids are obtained in a coarse-grained condition.

It has been suggested to produce coarse-grained separations from boiling solutions by causing the separated crystals to sink repeatedly down through the layer of liquid in which vapour bubbles are formed, the crystals being by some means or other caused to ascend repeatedly, and it has also been suggested to attain the same result by maintaining the crystals in suspension in the layers of liquid, where the vapour bubbles are formed. In publications describing these methods the idea has been clearly expressed, that the solution surrounding each vapour bubble is supersaturated, and that as a consequence hereof the dissolved substance will separate at this point and result in a growth of the crystals contained in the layers of liquid where vapour bubbles are evolved.

These known methods, however, involve great difficulties. Thus the method of repeatedly lifting the separated crystals by mechanical means renders the apparatus to be employed very complicated, so that it is not practically applicable in connection with apparatus of large size. But also the other known method referred to above involves great constructional difficulties. It is very difficult, if not entirely impossible to maintain a sufficient quantity of large crystals in suspension in the upper layers of the liquid, where the evolution of vapour takes place. This is a consequence of the obvious fact that the particles of liquid in the top layer can have no vertical but only horizontal velocity components. In addition the upper liquid layers owing to its being greatly mixed with vapour bubbles will have a much less weight in bulk than the massive liquid alone and will therefore not be able to hold the larger crystals in suspension. Sea water brine for example which is superheated by 1° C. will begin to evolve vapour bubbles only when it has reached so near to the surface of liquid, that it carries the weight of only a 290 mm. brine column, but on the short way left to the surface the volume will increase more than five times by the formation of vapour bubbles. Even in the case it were possible to hold the larger crystals in suspension in this light, mixed medium there would be room only for a quite small quantity of crystals in the comparatively thin layer, where the bubbles arise, and where the growth of the crystals should take place. Experience shows, however, that in industrial plants a very large total crystal surface, that is a very great number of crystals, is required to take up the solid separated from the solution. The fact is that the intensity of the crystal growth cannot be increased beyond a comparatively small figure, and if the quantity of crystals taking up the solid is too small, crystals of a small size are produced. In addition the intensity of the growth of the crystals will be greatly delayed by the growth taking place in a mixture of vapour bubbles and liquid. The fact is that the vapour adheres to the crystals. Firstly the portion of the crystals which is to be covered by the bubble is excluded from contact with the liquid. On the other hand the supporting power of the gas bubble will diminish the sinking velocity of the crystal relatively to the liquid, and this relative velocity is of the highest importance to obtain a rapid growth of the crystals, the growth by a given concentration being limited only by the velocity of the interchange of brine taking place around the crystal. In addition to all this comes that the substantial proportion of the crystals which are held up by the bubbles are of small size.

According to the present invention the difficulties and drawbacks referred to above are avoided by a method based upon a certain property possessed by liquids. I have found that when a solution for example sea water brine is evaporated, the saturated brine has a boiling point which is higher by about 0.25° C. when no suspended solid sodium chloride is present than when such suspended salt is present.

Experiments have also proved that in this superheated condition the brine is able to contain a much greater percentage of salt in solution than it can at the same temperature (obtainable by superpressure) when suspended salt is present. When the liquid contains suspended salt an increase in temperature by 0.25 C. will result in the dissolution of only a quite insignificant proportion of the suspended salt.

When the entire quantity of dissolved salt is designated as $\beta+\gamma$,—where $\gamma$ is the quantity dissolved by the last 0.25° C. of increase in temperature which has taken place in the presence of suspended salt,—then $\gamma$ is very small as compared with $\beta$. But if no suspended salt is present, then the brine at the temperature increased by 0.25° C. may contain a quantity of salt which is approximately $\beta+15\gamma$ and this supersaturated condition is completely stable in the sense that the supersaturation is not released even by very strong whirls and the presence of other solid bodies. Not before the critical supersaturation (corresponding to about 0.25° C. boiling point increase) is exceeded, can the salt separate as new kernels or upon other solid bodies.

This distinguishing feature that it is possible to prepare the solution at one point so that it becomes strongly supersaturated and then to carry it far away to another place where the supersaturation is released has not hitherto been so clearly recognized, observed and measured as to lead to technical conclusions, although it is of the greatest importance for the industrial producton of large crystals. The industrial crystallization methods hitherto employed have been based upon the assumption that the crystal kernels which should be caused to grow, must be in immediate proximity to the vapour bubbles which produce the supersaturation. The fact is that quantitatively incorrect view has prevailed as regards the supersaturation in the boiling zone in relation to the supersaturation which the brine is able to endure without producing new kernels, and moreover the opinion has been held, that the supersaturation can last only a very short time so that only from this reason the zones of bubble formation and of crystal growth must be coincident.

According to the present invention the new observation referred to above has been made use of in such a manner as to result in elimination of the drawbacks of the known methods, the crystal growth being caused to take place not in the parts of the apparatus, where boiling goes on, the vapour bubbles being formed in other places.

The invention is illustrated in the accompanying drawing, in which:

Fig. 1 is a sectional view of an apparatus which may be used to carry the invention into effect.

Fig. 2 is a sectional view of another embodiment of a suitable apparatus.

Fig. 3 is a sectional view of a detail of a modified apparatus for carrying the invention into effect.

In the example illustrated in Fig. 1 the solution enters from a superheater $a$ through a pipe $i$ into an evaporation chamber $b$ where the liquid has a large surface area. In this chamber the liquid boils and the vapour escapes through the pipe $c$. The liquid which has become supersaturated by boiling passes into the lower end of the crystal growth chamber $e$. This chamber contains a large number of the crystals which are to grow and the supersaturated solution gives off a proportion of the dissolved substance to these crystals. The sectional area of the top part of the funnel-shaped chamber $e$, containing the crystals, is so large that only quite small crystals are carried along with the liquid flow, which is gradually narrowed towards the opening $f$. From $f$ the solution is carried downwards to a pump $g$, which forces the solution further through the superheater $a$ upwards to the evaporator $b$.

An important part of an apparatus for the formation of large crystals during evaporation are the means to remove the finished crystals without the evaporation process being interrupted.

It is known in connection with the above mentioned known method,—whereby crystals are kept in suspension in the part of the apparatus where vapour bubbles arise,—that the crystals may be sorted by means of the flow of liquid, whereby the growing crystals are held in suspension. When the crystals have reached the described size, the crystals according to the known method shall descend against the flow of liquid into a dead space from which they may then be removed.

This method of removing the finished large crystals involves a great drawback. As a matter of fact, when the crystals shall be brought to descend from the main flow of liquid into a collecting dead space, not transversed by the main flow; then on the border between the main flow and dead space secondary currents will be formed, which will carry parts passing from the main flow into the dead space. The main flow will then always contain a proportion of coarse and fine crystals, because in apparatus of a comparatively large size it is practically impossible to use so large sectional areas that not a proportion of the liquid and crystals is carried along with the liquid and a part of these crystals will settle in the dead space together with the large crystals, which sink directly down through the main flow from the crystal growth chamber. Not only large crystals, but a mixture of large and small crystals will therefore become separated.

In the crystallization apparatus illustrated in Fig. 1 the finished crystals are therefore removed in another manner. The funnel $e$ is constructed with such a large angle $x$, that the large quantity of crystals contained therein is not always maintained in suspension at the same place, an ascending flow being produced in the centre and descending flows along the walls. A proportion of the crystal mass, which thus slides downwards along the wall passes over an opening $h$. Through this opening $h$ a flow of brine is constantly maintained, a small proportion of the brine passing through the pipe $i$, taking its course through the pipe $k$ and the opening $l$. By a suitable choice of dimensions it is possible to maintain in the opening $h$ a flow of such volume and velocity that the finished large crystals descend through the opening $h$ and the pipe $m$ to an elevator $n$, which conveys them up to above the level $o$ of the liquid, so as to allow of removing the crystals in a comparatively dry condition. The smaller crystals will not be able to sink down against the flow in the opening $h$, but move along as indicated by the arrows $p$ drawn in dotted lines into the main flow to grow further in size. By means of oblique or curved baffle plates $q$ a slow rotation of the liquid in the crystal space $e$ takes place so that in the course of time all parts of the crystal flow indicated by arrows $p$ will pass over the opening $h$.

The advantage of this method of removing the finished crystals consists therein that practically only large crystals may be obtained. Only a small proportion of the main flow in the pipe $i$ being required to effect the sorting in the opening $h$ it is easy by known means to effect a practically complete purification of this small quantity of brine so that no small crystals enter into the pipe $m$. The small flow of brine may be filtered, or it may be purified by centrifugal treatment or as indicated in Fig. 1 the sectional area of the small by-flow ascending from $k$ to $l$ may be made so large that practically no crystals are carried along with the liquid.

A known method of recent origin for the production of large crystals as hereinbefore mentioned makes use of the main flow carrying the crystals in suspension also to effect a sorting of the crystals. But to treat the entire main flow through $r$ in the same manner as above described, to filter it or to let it have such a large sectional area, that practically no crystals are carried along therewith would be practically impossible in apparatus of a large size from a constructional point of view. It would be impossible also from the reason that as a matter of course all crystals of a smaller size must be returned by the flow into the evaporator in which the growth of the crystals takes place. Otherwise the collected quantities of small-sized crystals must be returned to the evaporator for continued growth by means of an elevator or other complicated means.

The removal of the separated granules only after their having attained a certain size has another important consequence. When the new crystal kernels which shall grow in size are caused to arise spontaneously during the evaporation in the apparatus, there will be a contradiction between the uncontrolled formation of kernels and the requirement, that the separated granule should be removed only after having reached a certain size. When for example $n$ crystals having a side length of 4 mm. are removed, then the new kernels formed to compensate therefor must have at least the same surface as the said removed $n$ crystals in order to replace the same by the taking up of the quantity of substance separated in the unit of time. Before this surface area is reached, the formation of new kernels does not cease. Calculating for the sake of simplicity only from the moment when the new kernals have attained a side length of $\frac{1}{1000}$ of a millimetre, the number of the kernels must be $$\left(\frac{4}{0.001}\right)^2 \times n = 16{,}000{,}000 \times n$$

in order to represent this surface area.

When these kernels in the course of some time have grown to a side length of 4 mm. so that they are to be removed from the apparatus, their weight has thus become 16 million times as large as the weight of the $n$ crystals which were originally removed, and for which they should compensate. By common salt for example having a specific gravity of 2.3 the removal of a single finished crystal with a 4 mm. side length will cause a new kernel formation, which grows to 2,355 kilogrammes. When nothing is done to prevent this, then the apparatus will rapidly be choked up with crystals, which have not reached the full size, as a consequence of the fact, that the discharging devices do not allow of their being let out before this size has been reached.

The invention also comprises a simple means of avoiding this difficulty which appears strongly in all industrial crystal growth apparatus which forms their own new kernels during the evaporation, and in which the crystals are removed only after having grown to a certain size.

According to the invention the difficulty may be readily avoided by introducing kernels in certain controllable quantities into the crystal growth apparatus. This opens a new possibility of the greatest importance.

When it is no longer required that the apparatus itself shall produce the new kernels, which are necessary, then one needs no more to work with the critical supersaturation. As above in full described new kernels can be formed only when a certain critical degree of supersaturation has been reached.

When the operation of the apparatus takes place with such a large quantity of suspended kernels in the brine that the critical supersaturation does not arise and that as a consequence thereof no new kernels can be formed, then the kernels present will grow during the operation not in number, but only in size. Thus when in the unit of time an equally large number of small kernels are added from outside as are removed of large finished crystals, then the apparatus is maintained in a working condition and is not choked up.

The salient point, hitherto unknown, consists therein that by the above described method of supplying kernels from outside the necessity of working with the critical state of supersaturation is avoided, which state involves the growth of the separated kernels in size as well as in number.

When small kernels are employed for this supply from outside, the quantities by weight required are quite insignificant. For the production of 1000 kilogrammes of crystals of 4 mm. side length in the hour for example only:

$$1,000 \times \left(\frac{0.1}{4}\right)^3 = 1:64 \text{ kg.} = 15.4$$

grams of kernels with 1/10 mm. side length are needed in the hour, because as mentioned the required number of kernels is the same as the number of removed crystals.

When the solubility of the treated substances does not increase rapidly with the temperature, then the brine may also be sent through the crystal mass immediately after it has left the superheater the vapour bubbles being caused to be formed only after the brine has passed through the crystal growth space. An arrangement in which this course of circulation is made use of is illustrated in Fig. 2.

From the superheater $a$ the brine passes through the pump $g$ into the crystal growth space $e$. The largest cross-sectional area $s$—$s$ of the space is so dimensioned that only fine crystals can be carried further along with the flow of brine, which through the pipe $t$ enters into the evaporator space $b$. Vapour bubbles are not formed before the brine has reached this point. The main point is that the apparatus is of such a construction as to allow the level of liquid to be maintained at such a height above the collection of granules, that these latter on account of the statical pressure of the liquid will not be situated in the vapour bubble zone. The fact is that the means for producing the supersaturation is not the superheater but the evaporator and according to the present invention it is a necessary condition to maintain the zone of evaporation separated in space from the collection of growing granules. Removal of finished crystals may be effected by similar means as shown in Fig. 1.

When secondary influences such for example as local cooling of the brine due to insufficient heat insulation notwithstanding the use of supersaturations below the critical one renders it impossible to wholly prevent the formation of new kernels in the apparatus the injurious influence of such new formed kernels may be eliminated by removing the kernels before they have grown large.

This may be brought about in three different ways:

The kernels may again be dissolved by the brine, which is necessarily supplied to the apparatus. From practical reasons this brine will not be completely saturated and it can readily under any condition be maintained somewhat below the saturation point. It is therefore able to dissolve some suspended crystals. The rapidity with which this dissolution takes place will be higher in proportion as the quantity which the unity of liquid is able to take up before it is saturated increases. When the unsaturated newly introduced brine is mixed for example with an equal quantity b. v. of saturated brine in the apparatus, then the dissolving power of the mixture is present in a much less volume than in the case of one part of unsaturated new brine being mixed with 100 parts of saturated brine. The newly supplied unsaturated brine should therefore be mixed with a comparatively small quantity of saturated brine and kept separated from the rest of the brine in the apparatus in order to obtain a rapid dissolution of undesired new kernels.

In Fig. 3 is illustrated how this may be effected. In the crystallization vessel as shown in Fig. 2 is placed a pipe coil $u$. Through the pipe $v$ is supplied the unsaturated brine in a jet so as to carry along therewith a quantity of saturated brine through the pipe coil. The so produced brine mixture after having passed through the entire length of coil $u$ and being discharged at $w$ can mix to an unlimited extent with saturated brine.

Instead of a pipe coil one may of course also make use of a chamber of any other form, for example a cylindrical vessel.

Instead of dissolving the superfluous small kernels in the apparatus itself the kernels may be removed from the circulating flow by filtration, sedimentation or centrifugal treatment. This is most suitably effected by leading the brine from a point in the circulating flow, where it is practically free from coarse crystals through a separator and then back again into the flow. Fig. 1 illustrates by way of example an arrangement whereby this may be effected. Through the pipe $k$ a portion of the circulating flow free from coarse crystals enters a space having large cross-sectional dimensions, so that the small kernels are allowed to settle and may be removed at $y$.

The removed kernels may either be dissolved again in the unsaturated brine introduced into the apparatus or may for example be added to the removed coarse crystals because their quantity b. w. is very little when they are removed while still of a small size. When the apparatus produces crystals of for example 4 mm. side length and are the superfluous small kernels removed already when they have attained a side length of 1/10 mm. then the removal of 1 kg. of small kernels prevents the obstructing formation of $$1 \times \left(\frac{4}{0.1}\right)^3 = 64,000 \text{ kg.}$$

of finished crystals.

The third way of preventing the choking up influence of undesired small kernels is to adjust the discharger (Fig. 1) to such a weak sorting flow that not only large crystals, but also a small proportion of all sizes of crystals containing at any time in the apparatus are removed. As above explained in an ideal apparatus the size but not the number of added kernels increases. Because as mentioned as an example a given number of kernels with 1/10 mm. side length weighs only 1/64000 of what they weigh when grown to a size of 4 mm. side length it is evident that in the apparatus is present as a whole only a comparatively small proportion of the total weight of suspension in the form of small and very small crystals. And even if local injurious influences give rise to the formation of undesired small new kernels, then the total weight of these will be maintained quite small when regularly removed before having grown large. When not very strict requirements are set to the final product as regards freedom from small crystals it is possible in this manner to avoid the obstructing action of the small crystals.

In the case of the influences giving rize to the formation of new crystals in the apparatus being comparatively strong, notwithstanding the use of degrees of supersaturation which are below the critical one, and if one of the above mentioned three means are made use of to prevent an unallowable strong growth of the small kernels, it is not necessary to supply kernels from outside.

The hereinbefore described method of producing coarse separation products besides eliminating the above described serious difficulties connected with other methods also also has a further important advantage. Experiments which I have made have proved that it is possible to obtain the separated substance in the form of spherical or rounded granules instead of edged crystals, and this will frequently for example in the manufacture of common salt represent great advantages. A very large proportion of all common salt produced is utilized to salt fish and flesh, in which case the coarse salt is preferred, because it is more slowly dissolved. The coarse salt can therefore be sold at higher prices than the fine salt. Of all forms of bodies the spherical form has the smallest surface by a given volume, and therefore spherical salt granules will dissolve with the greatest slowness. Spherical salt granules are also less hygroscopical on account of their small surface, do not produce much dust by transfer and storage, because of their being without corners which may be torn off, and they also run out of openings of silos with greater readiness than granules of other shapes.

The reason why the spherical form is produced by the present process consists in the grinding action in the crystal growth space by the continuous flow of the mass upwards in the centre and downwards along the walls.

This action may also be intensified by agitators each agitator causing an intensification of the motion of the separated granules relatively to one another, and of the granules and the agitator relatively to one another as well as of the granules relatively to the walls.

The hereinbefore described method of forming large crystals or granules may also be employed when the heating is carried only so far as to result not in the production of vapour bubbles, but only in evaporation from the surface and also where no heater ($a$) is employed and where only a cooling of the liquid at the surface ($o$) for example by means of cooling pipes is made use of.

The cooling or evaporation whereby the supersaturation is produced may be accelerated by blowing air into the solution.

I claim:

1. Process of forming coarse-grained crystalline products from solutions by growing crystals therein which comprises maintaining a flow of the solution of the material to be crystallized, producing supersaturation of the solution at one point in the flow and contacting the solution with a mass of crystals of the material at a place spaced apart from the place at which the supersaturation of the solution is produced.

2. In the art of forming coarse-grained crystalline products from solutions by growing crystals therein, the steps which consist in maintaining a continuous circulation of a solution of the material to be crystallized, producing supersaturation in the solution at one place in the circulation, flowing the supersaturated solution through a suspension of growing crystals of the material at a place spaced apart from the place at which the supersaturation of the solution is produced, and separating the finished coarser crystals from the suspension of crystals by causing them to sink downwardly in an ascending flow of a portion only of the solution.

3. In the process of forming coarse-grained crystalline products from solutions by growing crystals therein as defined in claim 1, the step which consists in supplying the mass of crystals with which the solution is contacted solely from an outside source.

4. In the process of forming coarse-grained crystalline products from solutions by growing crystals therein as defined in claim 1, the step which consists in introducing fresh unsaturated solution of the material to be crystallized into the solution under treatment by mixing the fresh unsaturated solution with a small fractional part of said solution under treatment and mixing the resulting solution with the remainder of the solution under treatment.

5. In the process of forming coarse-grained crystalline products from solutions by growing crystals therein as defined in claim 1, the steps comprising separating a portion of the solution under treatment from the main flow thereof at a point at which said main flow of solution is substantially free of coarse-grained crystals, separating fine-grained crystals from said portion of the solution, and returning said portion to the main flow of solution.

6. In the process of forming coarse-grained crystalline products from solutions by growing crystals therein as defined in claim 1, the step which consists in maintaining the crystals of said mass of crystals in rapid motion with respect to each other and to the apparatus in which the solution is contained by mechanical means.

7. Process of forming coarse-grained crystalline products from solutions by growing crystals therein as defined in claim 1, in which the supersaturation in the solution is produced by cooling.

8. Apparatus for forming coarse-grained crystalline products from solutions by growing crystals therein, comprising in combination means for superheating a solution of the material to be crystallized, means for passing the said solution from the superheater to a crystallizing vessel adapted to hold a suspension of crystals and through this suspension, and means to enable the column of solution contained in the said crystallizing vessel above the suspension to be maintained at such a height that the vapour bubbles are not formed in the suspension but only above it.

9. Apparatus for forming coarse-grained crystalline products from solutions by growing crystals therein, comprising in combination a crystallizing vessel adapted to hold a mass of crystals, means separate from said crystallizing vessel for producing supersaturation in a solution of the material to be crystallized, and means for passing the solution of the material to be crystallized from said means for producing supersaturation to said crystallizing vessel and through the said mass of crystals therein.

In testimony that I claim the foregoing as my invention, I have signed my name in presence of two subscribing witnesses.

ISAK ISAACHSEN.

Witnesses:
EDWARD JOHNSON,
DAGNZ SZVERSEN.